(12) United States Patent
Gaudreault

(10) Patent No.: US 11,432,465 B2
(45) Date of Patent: Sep. 6, 2022

(54) SHREDDING AND BALING APPARATUS AND METHOD

(71) Applicant: Gyro-Trac Corporation, Summerville, SC (US)

(72) Inventor: Daniel Gaudreault, Summerville, SC (US)

(73) Assignee: Gyro-Trac Corporation, Summerville, SC (US)

(*) Notice: Subject to any disclaimer, the term of this patent is extended or adjusted under 35 U.S.C. 154(b) by 400 days.

(21) Appl. No.: 16/433,741

(22) Filed: Jun. 6, 2019

(65) Prior Publication Data

US 2019/0281767 A1 Sep. 19, 2019

Related U.S. Application Data

(63) Continuation-in-part of application No. 15/269,071, filed on Sep. 19, 2016, now Pat. No. 10,363,716, (Continued)

(51) Int. Cl.
*A01F 15/07* (2006.01)
*A01F 15/10* (2006.01)
(Continued)

(52) U.S. Cl.
CPC .......... *A01F 29/005* (2013.01); *A01F 15/07* (2013.01); *A01F 15/071* (2013.01); (Continued)

(58) Field of Classification Search
CPC .... A01F 15/07; A01F 15/071; A01F 15/0715; A01F 15/106; A01F 2015/108; (Continued)

(56) References Cited

U.S. PATENT DOCUMENTS

| | | | |
|---|---|---|---|
| 4,375,187 A | 3/1983 | Kluver et al. | |
| 5,129,207 A | 7/1992 | Butler | |

(Continued)

FOREIGN PATENT DOCUMENTS

| | | | |
|---|---|---|---|
| JP | 2015039363 A | * | 3/2015 |
| KR | 20140063980 A | | 5/2014 |

*Primary Examiner* — Jimmy T Nguyen
(74) *Attorney, Agent, or Firm* — Southeast IP Group LLC; Thomas L. Moses

(57) ABSTRACT

A shredding and baling apparatus provided includes a shredding assembly operatively connected to a baling assembly via a conveyor. A rotatable drum with cutting teeth spirally arranged along the drum is preferably centered within a lower portion of an intake hopper for cutting through material as it is fed into the hopper. Fixed cutting teeth are preferably arranged in a row or rows along each of the longitudinal sidewalls of the hopper, adjacent the cutting drum. A touch screen display and computer may be used in combination with sensors to monitor and control the shredding and baling operation, and a hydraulic system is used to drive the components. The shredding and baling assembly is preferably designed in an industrial size to handle high volumes of material and may be driven or transported from one location to another.

5 Claims, 17 Drawing Sheets

Related U.S. Application Data which is a continuation-in-part of application No. 14/716,229, filed on May 19, 2015, now Pat. No. 10,721,872.

(60) Provisional application No. 62/000,221, filed on May 19, 2014.

(51) Int. Cl.
    *A01F 29/00*     (2006.01)
    *A01F 29/12*     (2006.01)

(52) U.S. Cl.
    CPC ............ *A01F 15/106* (2013.01); *A01F 29/12* (2013.01); *A01F 2015/108* (2013.01)

(58) Field of Classification Search
    CPC .. A01F 2015/078; A01F 29/005; A01F 29/04; A01F 29/12; B02C 18/0007; B02C 18/2241; B02C 2018/0061; B65B 11/025; B65B 65/02; B65B 59/04; B65B 41/12
    USPC ......................................................... 100/88
    See application file for complete search history.

(56) References Cited

U.S. PATENT DOCUMENTS

| | | | |
|---|---|---|---|
| 5,224,329 A | 7/1993 | Viaud | |
| 6,021,622 A | 2/2000 | Underhill | |
| 7,003,933 B2* | 2/2006 | Fukumori | A01F 15/106 53/504 |
| 8,656,830 B2* | 2/2014 | Kraus | A01F 15/0816 100/35 |
| 8,910,460 B2* | 12/2014 | Horstmann | A01F 15/0715 56/341 |
| 2003/0093979 A1* | 5/2003 | Fukumori | A01F 15/07 53/587 |
| 2005/0247215 A1 | 11/2005 | Biziorek et al. | |
| 2011/0290921 A1* | 12/2011 | Gaudreault | A01D 43/08 241/25 |
| 2012/0096827 A1 | 4/2012 | Chaney et al. | |
| 2013/0008564 A1* | 1/2013 | Gaudrault | B02C 23/00 144/373 |
| 2014/0237981 A1* | 8/2014 | Roberge | A01D 91/00 56/341 |

\* cited by examiner

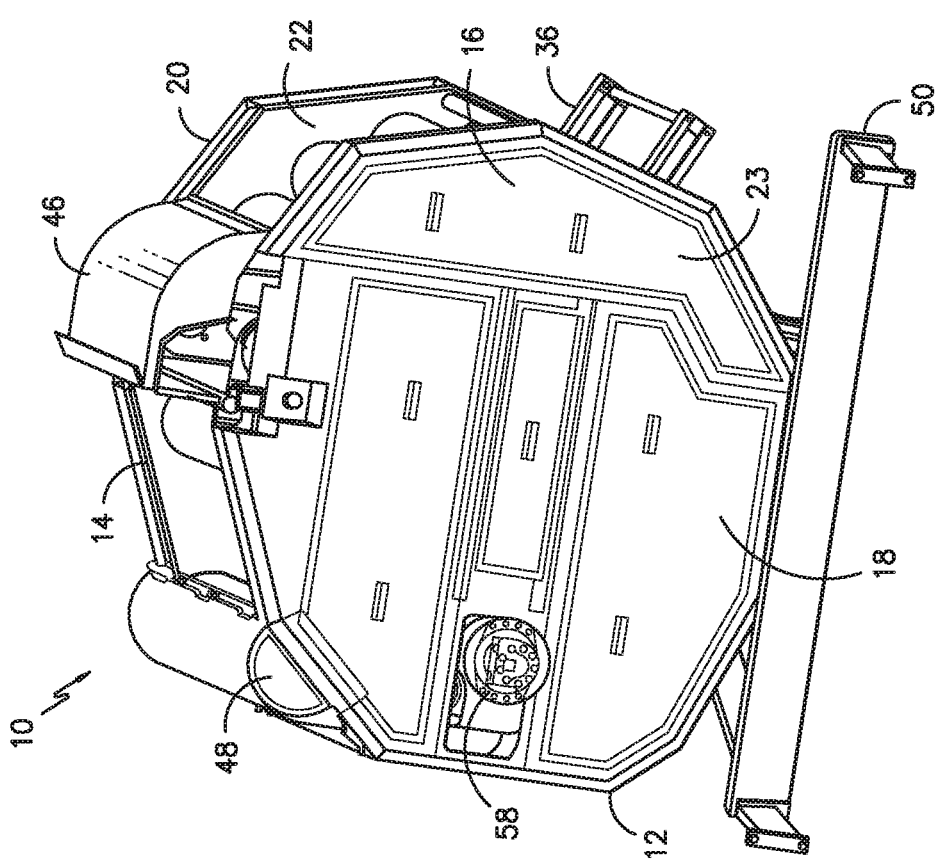

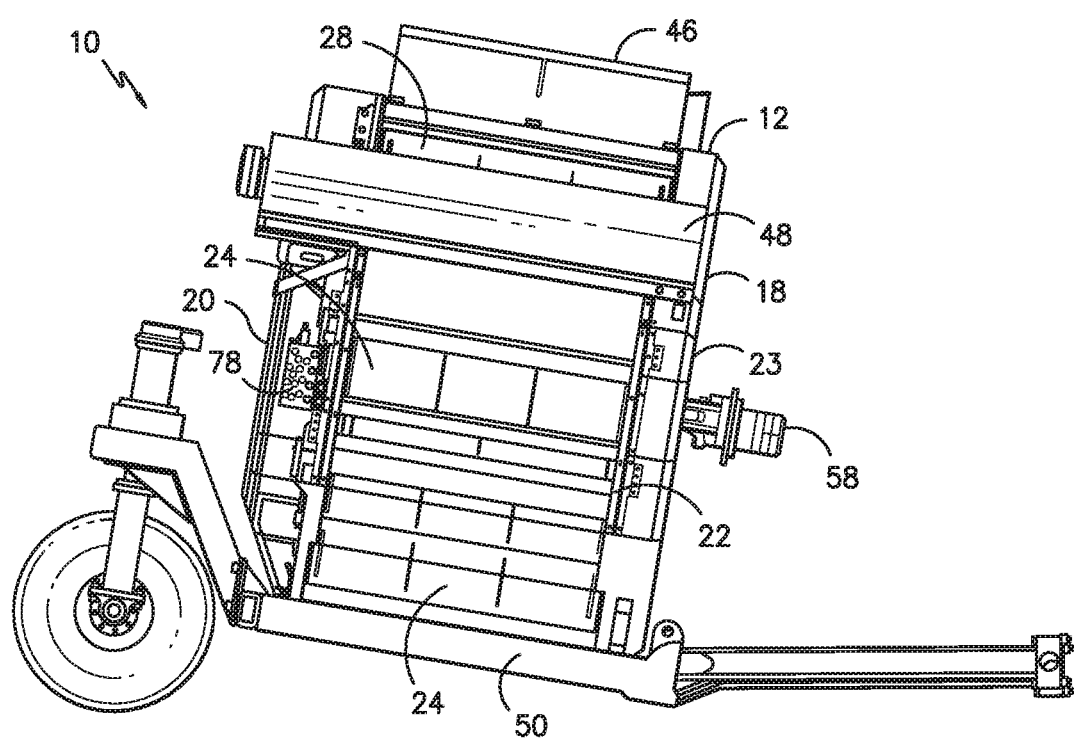
FIG. -10-

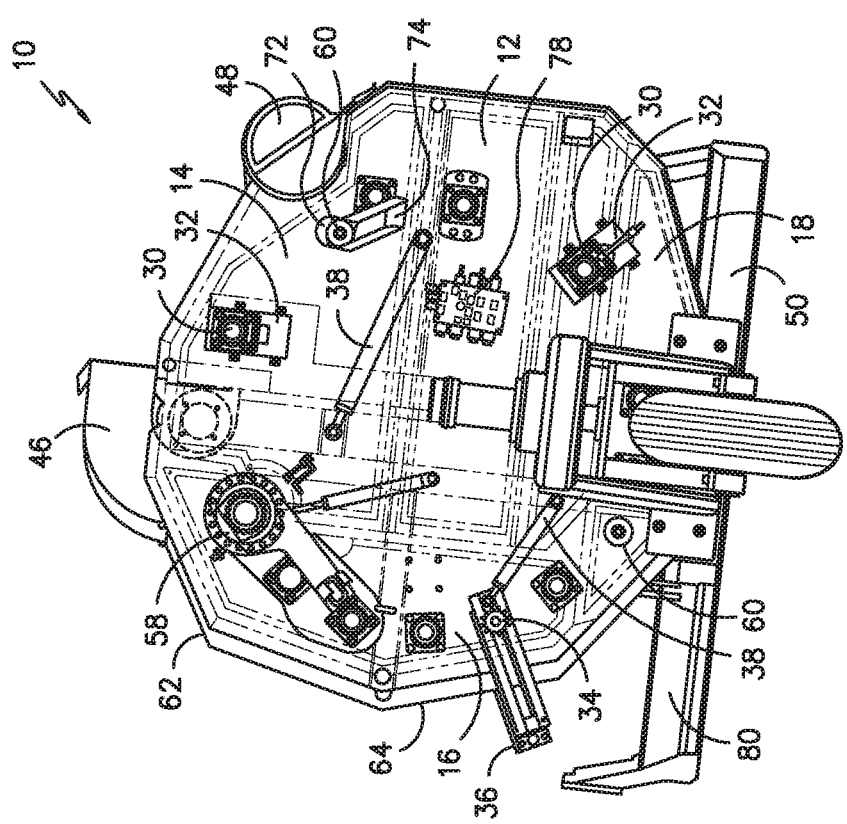
FIG. -11-

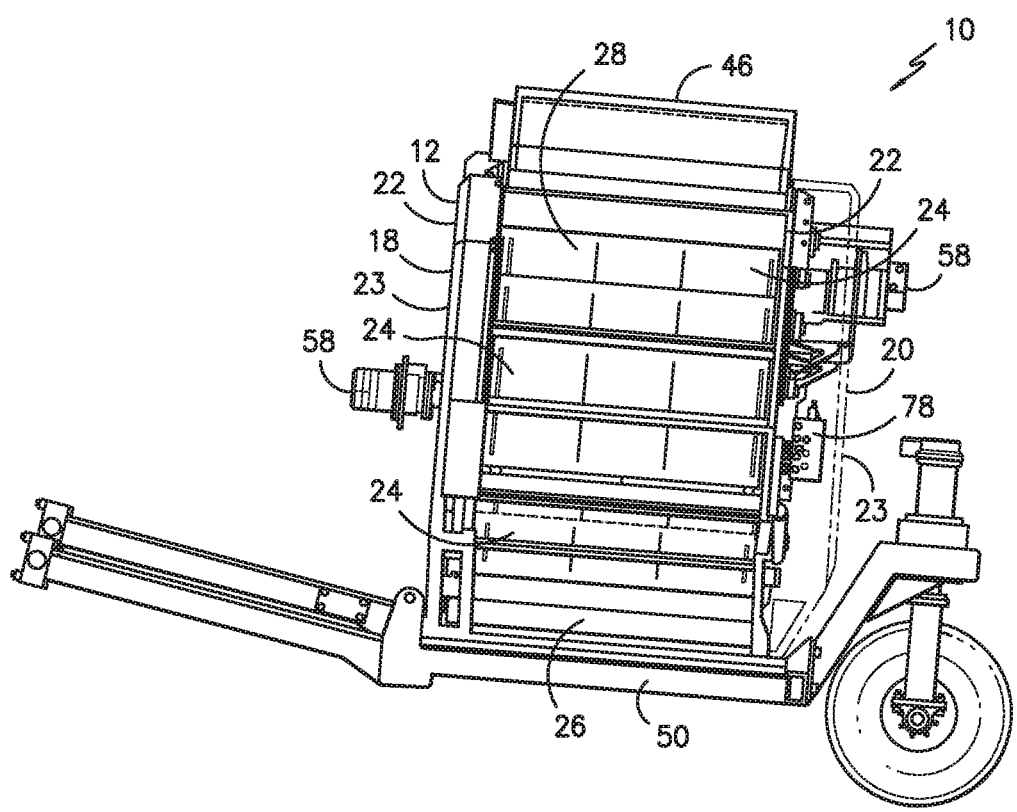
FIG. -12-

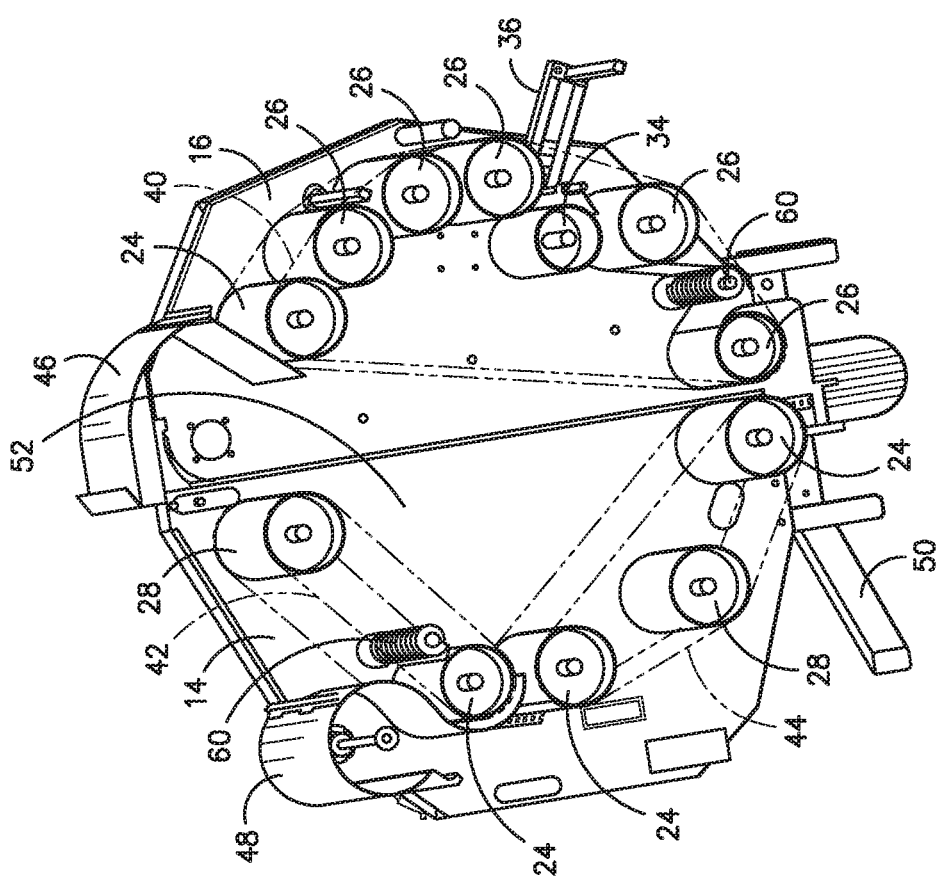
FIG. -13-

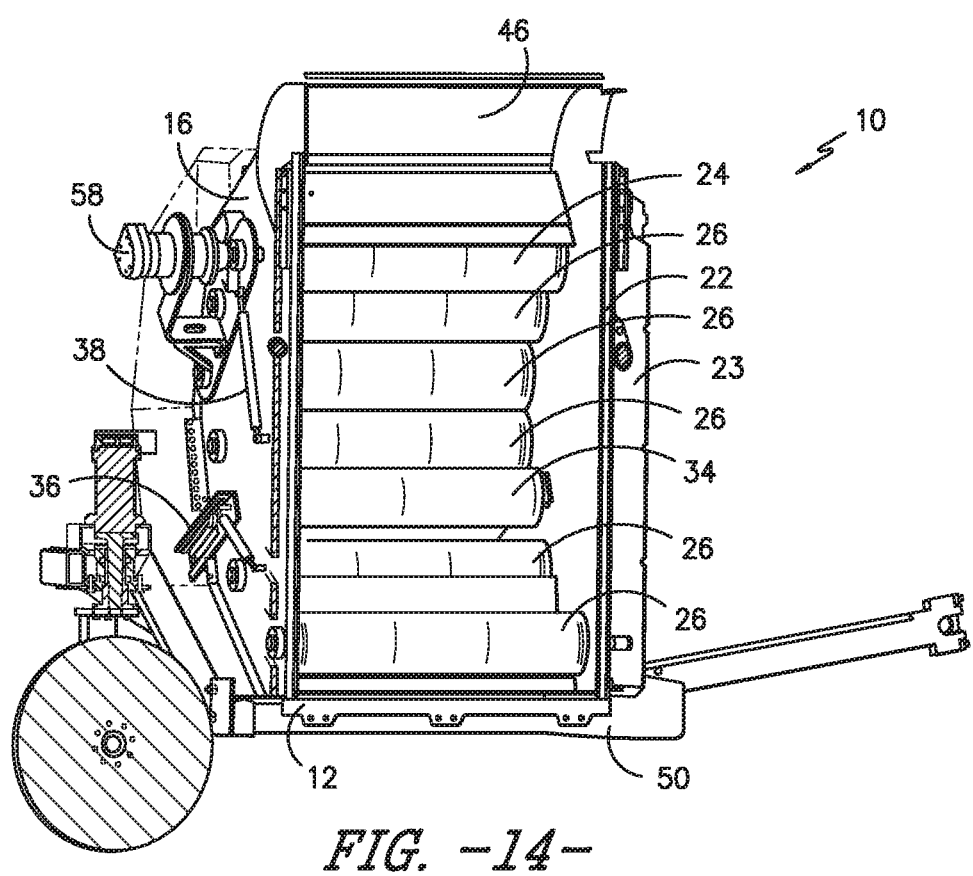
FIG. -14-

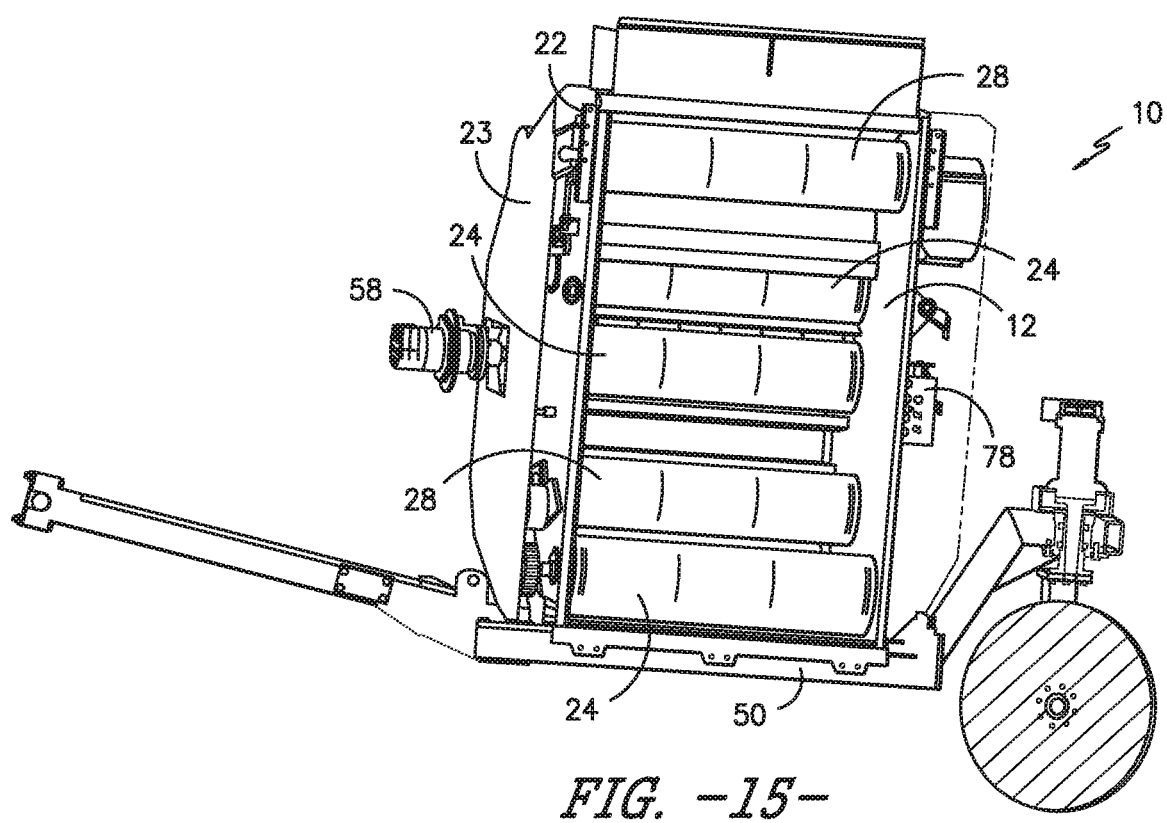
FIG. -15-

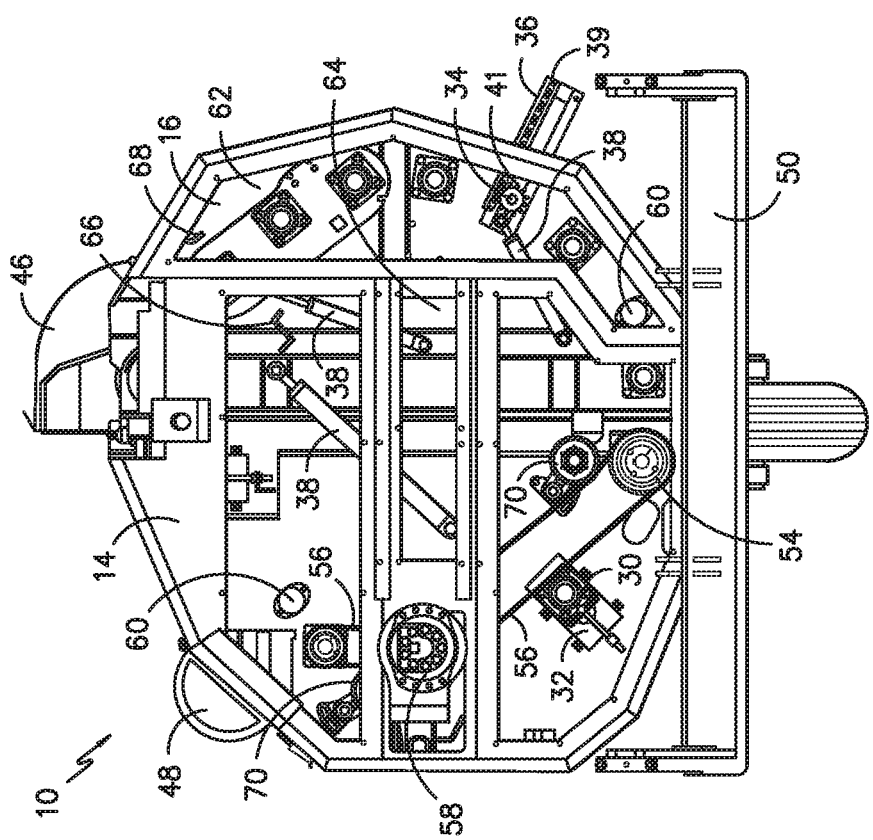
FIG. -16a-

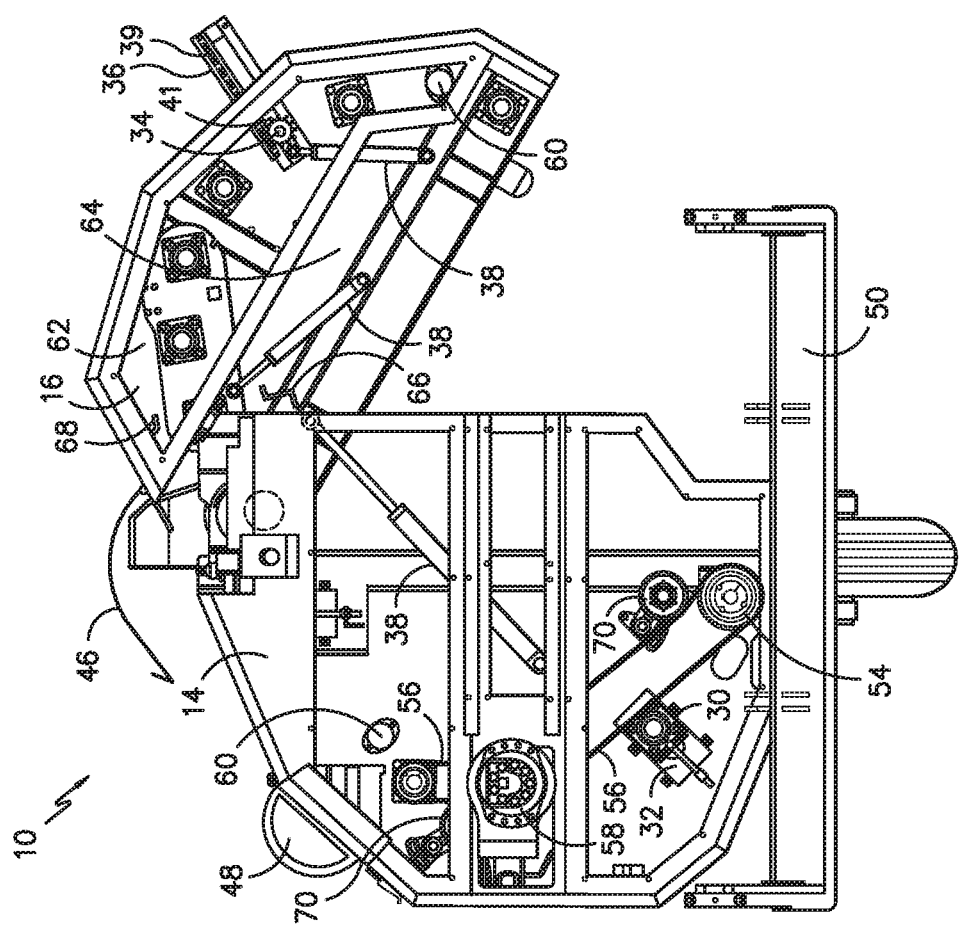
FIG. -16b-

SHREDDING AND BALING APPARATUS AND METHOD

CROSS-REFERENCE TO RELATED APPLICATIONS

The present application is a continuation-in-part of U.S. application Ser. No. 15/269,071, entitled Shredding and Baling Apparatus and Method filed on Sep. 19, 2016, which is a continuation-in-part of U.S. application Ser. No. 14/716,229, entitled Shredding and Baling Apparatus and Method filed on May 19, 2015 which is a non-provisional of U.S. Provisional No. 62/000,221, entitled Baling Apparatus and Method filed on May 19, 2014. All of the foregoing application are hereby incorporated by reference in their entireties.

BACKGROUND OF THE INVENTION

The present invention generally relates to an apparatus and method for shredding and crushing refuse and then baling the crushed material. More specifically, the present invention relates to a mobile apparatus that receives a high volume of material, such as tree branches, trash, demolition materials from a roll-off container, or the like, shreds and/or crushes the material into smaller debris, compresses the debris into a bale, and then wraps the bale with material to hold the bale together for transport and storage purposes. The apparatus may be portable so that it can be moved from one site to another and allows for a variety of materials (i.e. wood, metal, plastic, etc.) to be shredded and baled together at one time without the need for separation or sorting of materials.

A shredder or crusher typically has rotating blades which shred and shear material as it is fed into the shredding apparatus, and the shredded material may then be collected in a receptacle that may be located underneath or in proximity to the shredder. Usually shredders are designed to handle a specific type of material, such as plastics, wood, or paper. The object of a shredder is to reduce materials to a much smaller size for recycling or disposal, as shredded material occupies much less space than non-shredded, intact material.

A drawback to typical shredders is the fact that, although the material is reduced in size, the smaller, loose material is harder to collect and contain when transporting and/or disposing. Additionally, typical shredders tend to include a plurality of rotating cutting mechanisms as well as a screening apparatus to ensure that only small sized debris is released from the shredder; any larger sized debris may make additional passes through the shredding mechanism until it is shredded to a much reduced size. It would be advantageous to provide an apparatus that is simplified to a single shredding or cutting mechanism, and whereby the resulting size of the shredded debris need not be screened to a uniform size. Furthermore, it would be advantageous to provide an apparatus that can subsequently bale the loose material after shredding, such that the smaller, loose material is compacted into a bale that can be much more easily transported. In addition, the baling process itself serves to compact the material and reduce the size of space occupied by the garbage or recyclable material.

A baler is a piece of farm machinery used to compress a cut and raked crop (such as hay, cotton, straw, or silage) into compact bales that are easy to handle, transport, and store. Several different types of balers are commonly used, each producing a different type of bale—rectangular or cylindrical, of various sizes, bound with twine, strapping, netting, or wire. Industrial balers are also used in material recycling facilities, primarily for baling metal, plastic, or paper for transport.

The most common type of baler in industrialized countries today is the large round baler. It produces cylinder-shaped "round" or "rolled" bales. The design has a "thatched roof" effect that withstands weather well. Grass is rolled up inside the baler using rubberized belts, fixed rollers, or a combination of the two. When the bale reaches a predetermined size, either netting or twine is wrapped around it to hold its shape. The back of the baler swings open, and the bale is discharged. The bales are complete at this stage, but they may also be wrapped in plastic sheeting by a bale wrapper, either to keep hay dry when stored outside or convert damp grass into silage.

Heretofore, baling was primarily used in connection with hay, cotton, straw, or other types of fibrous materials. It has been contemplated that baling other types of materials, such as dirt, mulch, and household garbage, for instance, would be beneficial, because those materials could be compressed into much smaller units that would occupy significantly smaller volumes than the loose materials that remain uncompressed. One problem, however, with baling dirt and mulch (for example), is the difficulty in compressing that material to form into a bale, and then ensuring that the bale would remain intact, rather than simply falling apart. Hay, cotton, and straw bales tend to remain intact after the baling operation has been completed, largely due to the length and fibrous nature of those materials. Dirt and mulch, which includes much smaller particulate, would simply crumble out of the sides of the bale during the baling process, and thus, balers for these types of materials have never been successfully manufactured and commercialized.

Several patents and publications, incorporated herein by reference, describe a variety of shredding and baling or compacting mechanisms. U.S. Pat. No. 5,052,170 describes a shredder attachment for a round bale hay baler which will effectively shred corn stalks or stubble, milo stubble and the like and discharge the shredded stubble into a round bale hay baler which will form a bale of stubble which has been shredded which can be used for feed, bedding and the like.

U.S. Pat. No. 6,491,245 describes a mobile shredding and material handling and feed system, preferably for use in the handling and shredding of paper and other office related feedstock. An embodiment of the system on the input side utilizes an input hopper, a first conveyor, a feed aperture, and a second conveyor which moves excess feedstock away from the entry to the shredder feed aperture to avoid jamming the feed aperture. An embodiment of the invention on the output side utilizes a compactor, preferably one or more augers, to compact the shredded material exiting the shredder, and moving said compacted shredded material to the discharge or system output. An embodiment of this material handling and feed system also applies for balers.

U.S. Pat. No. 6,499,931 describes a vehicle for collecting, sorting and reducing the volume of recyclable wastes and regular household and commercial garbage includes a large container with plural compartments mounted to the exterior of the vehicle includes a lifting mechanism for lifting the container to the top of the vehicle so that its contents can be dropped through chutes into plural bins. Between the chutes and the bins are crushers and shredders for reducing of volume of wastes deposited in the bins. Other wastes are placed in balers for baling.

U.S. Pat. No. 6,820,542 describes an apparatus for compacting and baling leaves, grass clippings, sticks, pine straw and other debris on lawns, yards, or fields is provided. The apparatus may have diagonal brushes to gather debris for processing though a crusher, a conveyor belt to transport the crushed debris, and a baler to compact and bale the debris. The baler may compact the debris by rotating the debris in a continuous band, into which baling material may be inserted to bale the debris. Alternatively, the debris may be gathered and feed into a crusher that deposits the crushed debris directly into the baler for compacting and baling. Further still, the apparatus may gather the debris with brushes and feed it onto a conveyor mechanism 30 that then introduces it into a crusher. The crushed debris may then be feed into a baling mechanism that compacts and bales the debris for easy removal and disposal. In its various embodiments, the present invention may be connected to a prime mover or alternatively connected to a portable base with a motor for driving the device.

The shredders and balers of the prior art suffer from disadvantages such as only being able to shred and bale a particular type of material, the design of the shredding apparatus is more complicated and therefore more expensive, and/or the shredding and baling apparatus is only capable of small scale jobs (i.e. shredding and baling twigs and leaves while being pushed around a lawn).

It would be particularly advantageous to provide an industrial sized shredder and baler method and apparatus for shredding and baling multiple types of materials at one time, and particularly non-fibrous materials that have, heretofore, been difficult shred and form into bales. The advantages of shredding and baling these and other materials include the ability to transport the bales, stack the bales for efficient storage, and compressing the materials into a volume that is much smaller than the volume of the unshredded and/or uncompressed material. Wood can be shredded and baled for biomass; and, much larger quantities of garbage, wood, and demolition materials can be transported for disposal at a single time or on a single vehicle as compared to previous methods.

The shredder-baler may be mounted on a trailer or flatbed whereby the shredded material may transported to the baler via conveyer, allowing for a portable system that can be scaled up or down in size and driven anywhere shredding and baling is needed. One useful technique would be to drive a single shredder-baler to a demolition or disaster site for quick and efficient clean up. For example, rather than needing ten to twenty roll-off container trucks lined up to collect and contain debris and materials, a single shredder-baler may be driven onsite along with a flatbed truck to collect and stack the bales. Potentially, a single flatbed truck could hold 15-20 roll-off containers worth of baled debris.

Another useful technique would be to use the shredding and baling combination apparatus on a trash or refuse collecting truck in order to compress and bale household or commercial trash. In such an arrangement, the trash workers could load trash directly into a hopper or feeder for the shredder for shredding and subsequent compression and baling. When the bale reaches capacity and is released from the baler, the bale of trash could be stacked onto a flatbed of a truck, and additional bales could be stacked on top of one another in a compressed state, which means that such a truck could transport vastly larger quantities of trash than currently available methods allow. When the trash bales are delivered to a landfill, the bales could be neatly stacked, creating a much cleaner appearance, with the added benefit that the bales only occupy approximately 10% of the volume of uncompressed, loose trash and refuse. Thus, in this way, a landfill having a certain land area could contain as much as ten times the amount of trash dumped there in an uncompressed, loose manner as is typical of landfills in use today.

SUMMARY OF THE INVENTION

The instant shredding-baling apparatus, in a preferred embodiment, includes a shredding apparatus operably connected to a baler via a conveyor. In one embodiment, the shredder includes an intake hopper with sidewalls for receiving and containing materials as they are fed into the shredder for shredding. A rotatable drum with cutting teeth spirally arranged along the drum is preferably centered within a lower portion of the hopper for cutting through material as it is fed into the hooper. Fixed cutting teeth are preferably arranged in a row or rows along each of the longitudinal sidewalls of the hopper, adjacent the cutting drum. The cutting drum is preferably motor-driven and rotates at a speed sufficient to cut and reduce the material in size so that it may be compressed and baled by the baler. Contrary to typical shredders of the prior art, the size of the shredded material need not be uniform or a specific dimension, provided the material can be successfully baled by the baler. Furthermore, the shredder-baler of the present invention is preferably designed in an industrial size to handle high volumes of material.

The baler includes housing having a fixed portion and a movable portion (or "door") pivoting upward and outward in relation to the fixed portion, wherein the door may pivot between an open and closed position. A series of rollers are arranged about the periphery of the housing, on an inner portion thereof, in a generally circular configuration. A series of large, flexible bands or belts are positioned within the housing, extending almost the entire width of the inside of the housing, and engage the rollers during the baling operation. The apparatus includes a hopper for feeding material to be baled ("bale material") into the baler, and specifically for feeding the bale material to the inside area of the housing between the belts.

In a preferred embodiment, several of the rollers positioned on the fixed portion of the housing include three rollers that are driven by a hydraulic motor (either directly, or indirectly via a pulley mechanism), along with two adjustable rollers that are slidably mounted so that they may move inwardly or outwardly with respect to the housing for purposes of belt replacement. On the door side of the housing, the rollers preferably include a driven roller, six fixed rollers, together with a movable tensioner roller. The tensioner roller is mounted on a mechanism that includes a pair of tracks extending outwardly from the door, so that the tensioner can move inwardly and outwardly along the tracks. The tensioner roll is used to push against the belt inwardly during the baling operation to apply compression forces onto the outer side of the belt, which serves to compress the baling material into an extremely tight configuration, so that the bale can maintain its structural integrity after it has been wrapped and released from the baler. The tensioner roll mechanism is driven inwardly and outwardly by a hydraulic piston. A pair of rotating auger members are disposed within the housing toward the outer periphery thereof, and are used to catch and remove any errant chips or pieces of bale material that fall between the belts and the housing, in order to prevent any such chips or pieces from interfering with the mechanical components of the baler. The chips are caught up in the rotating helical screw blade and transported to an exit port in the side of the housing where they are ejected therefrom.

In operation, the bale material is fed through the hopper, and the hydraulic motors drive the belts that are positioned on the rollers in the baling cavity of the housing. The tensioner roller moves inwardly to apply a compressive force against the belt and the bale material disposed within the baling cavity. A sensor apparatus monitors the bale size to determine when the bale is nearing and has reached its maximum capacity. When the bale has reached its maximum capacity, a wrap feeder begins to feed a wrap (preferably a strong netting material) around the bale through several revolutions under high tension, in order to hold the bale together. Once the wrapping operation is completed, the wrap material is cut or broken, and the door opens to release the bale from the baler. At this point, the operation may start over again in order to create the next bale.

BRIEF DESCRIPTION OF THE DRAWINGS

These and other features, aspects, and advantages of the present invention will become better understood with regard to the following description, appended claims, and accompanying drawings where:

FIG. 9 is a perspective view of a baling apparatus in accordance with one aspect of the present invention;

FIG. 10 is side view of a baling apparatus in accordance with one aspect of the present invention;

FIG. 11 is a rear view of a baling apparatus in accordance with one aspect of the present invention;

FIG. 12 is a side view of a baling apparatus in accordance with one aspect of the present invention;

FIG. 13 is a cross-sectional view of a baling apparatus in accordance with one aspect of the present invention, illustrating the arrangement of rollers and augers within the housing;

FIG. 14 is a cross-sectional view of a baling apparatus in accordance with one aspect of the present invention, illustrating the arrangement of rollers positioned within the housing on the pivoting door side thereof;

FIG. 15 is a cross-sectional view of a baling apparatus in accordance with one aspect of the present invention, illustrating the arrangement of rollers positioned within the housing on the on the fixed side thereof;

FIG. 16a is a cutaway front view of a baling apparatus in accordance with one aspect of the present invention, wherein the outer wall of the housing has been cut away to reveal the components positioned between the outer wall and the inner wall of the housing on the front side thereof: and FIG. 16b is a cutaway front view of a baling apparatus in accordance with one aspect of the present invention, wherein the outer wall of the housing has been cut away to reveal the components positioned between the outer wall and the inner wall of the housing on the front side thereof, and the hinged door is shown in an open position.

DETAILED DESCRIPTION OF THE INVENTION

Overview

Figure 1:
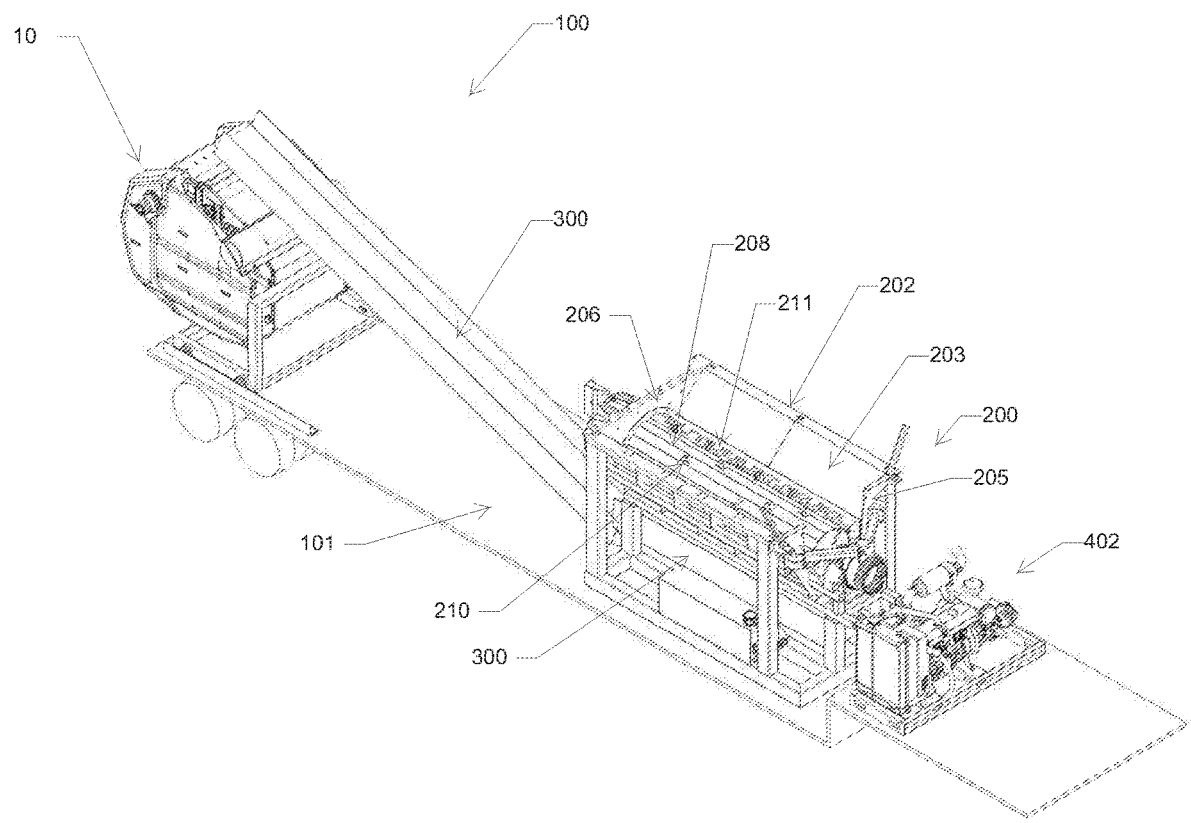
FIG. 1 is a front perspective view of a shredding and baling apparatus in accordance with one aspect of the present invention.

One preferred embodiment of a shredding-baling apparatus 100 is illustrated in FIGS. 1-16. The apparatus presented herein is capable of being attached to any number of platforms or frames. In one embodiment, the shredder-baler 100 may be mounted on a dedicated platform 101 that includes a wheel or multiple wheels, so that it may be towed like a trailer behind any large mobile vehicle or piece of equipment, such as a truck, tractor, or the like. The shredder-baler 100 may also be mounted to the bed of a large flat-bed truck. Further, the shredder-baler 100 may be attached to or incorporated with another vehicle or piece of equipment such as a trash truck. In essence, the shredder-baler 100 may be used by itself as a single unit, or in combination with other heavy equipment in many different configurations, as desired. It is contemplated that in a preferred embodiment, the shredder-baler 100 is industrial sized and capable of providing clean-up to construction sites, disaster sites, or any other area where high volume and high-throughput removal of debris is needed.

In a preferred embodiment, the shredder-baler 100 includes a shredding assembly 200 adjacent and operatively connected to a baling assembly 10, preferably with a conveyor means 300 to convey the shredded material to the baling assembly 10. The shredding assembly 200 includes an intake hopper 202 for receiving the material that is to be shredded, and a shredding mechanism 201 for shredding the material as it is fed into the intake hopper 202. The shredded material may then fall on to the conveyor means 300 below where it is transported to the baling assembly 10. The conveyor means 300 preferably terminates above a baler hopper 46 that feeds the shredded material into the baling assembly 10. Once the material has been baled, compressed, and wrapped, it may be released from the baling assembly 10.

Shredding Assembly

The shredding assembly 200 of the present invention is efficient in both cost and operation due to the simplicity of the design. In a preferred embodiment, the shredding assembly 200 consists of a rotatable shredding mechanism 201, such as a cutting drum 208, located within an intake hopper 202. When looking at a front cross-sectional view of a preferred embodiment, such as FIG. 4, it can be seen that the bottom of the intake hopper 202 is preferably open so that the cutting drum 208 is freely exposed to the conveying mechanism 300. In this way, as the material becomes shredded, the debris may fall directly onto the conveyor 300 after being passed over the cutting drum 208.

Intake Hopper

Figure 4:
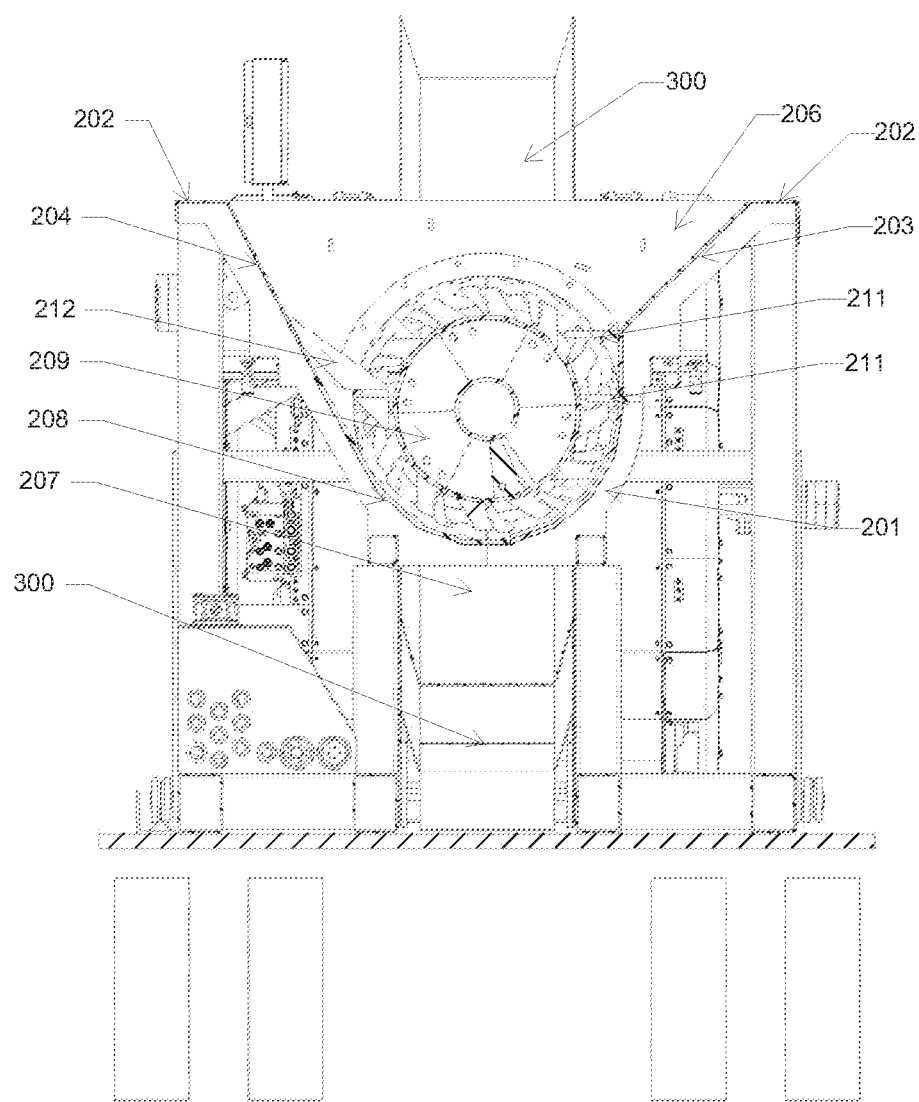
FIG. 4 is a front cross sectional view of a shredding and baling apparatus in accordance with one aspect of the present invention, illustrating the shredding mechanism of the shredding assembly.
Figure 5:
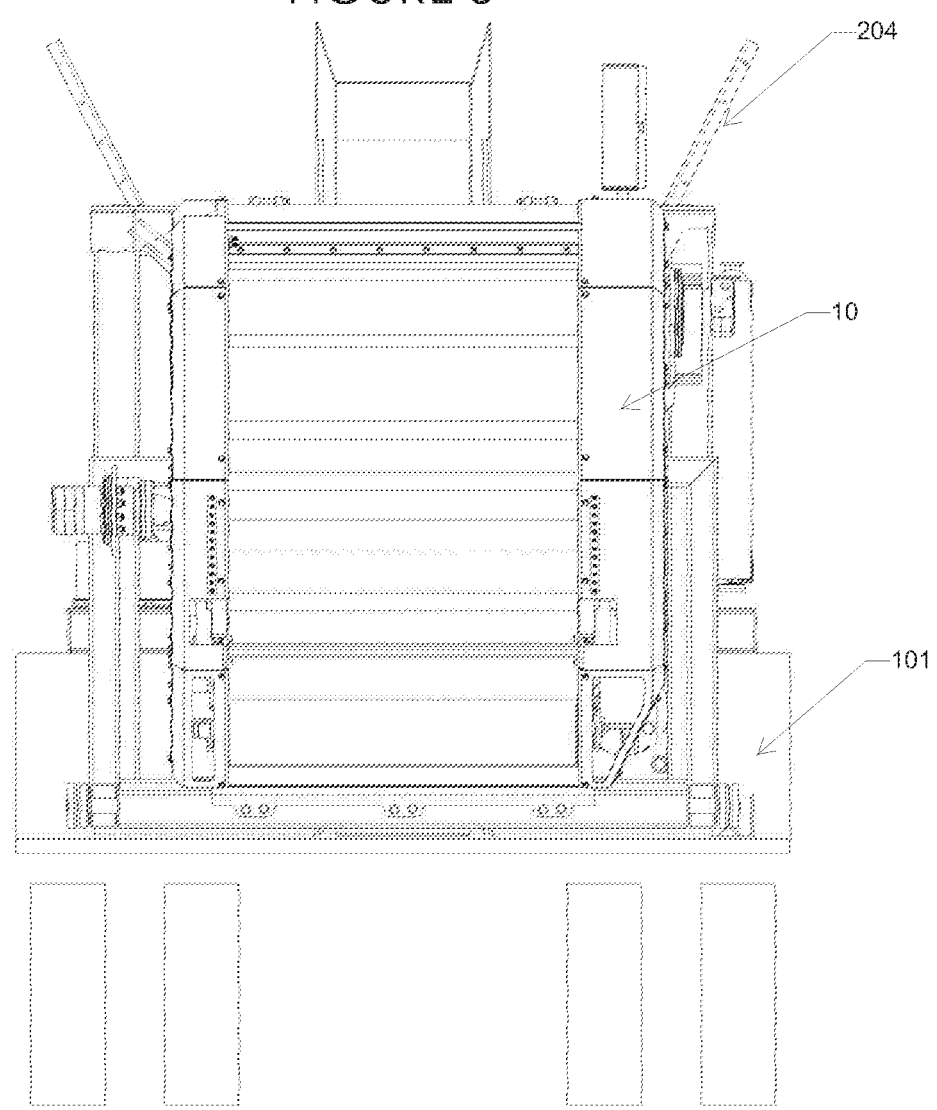
FIG. 5 is a rear view of a shredding and baling apparatus in accordance with one aspect of the present invention.
Figure 6:
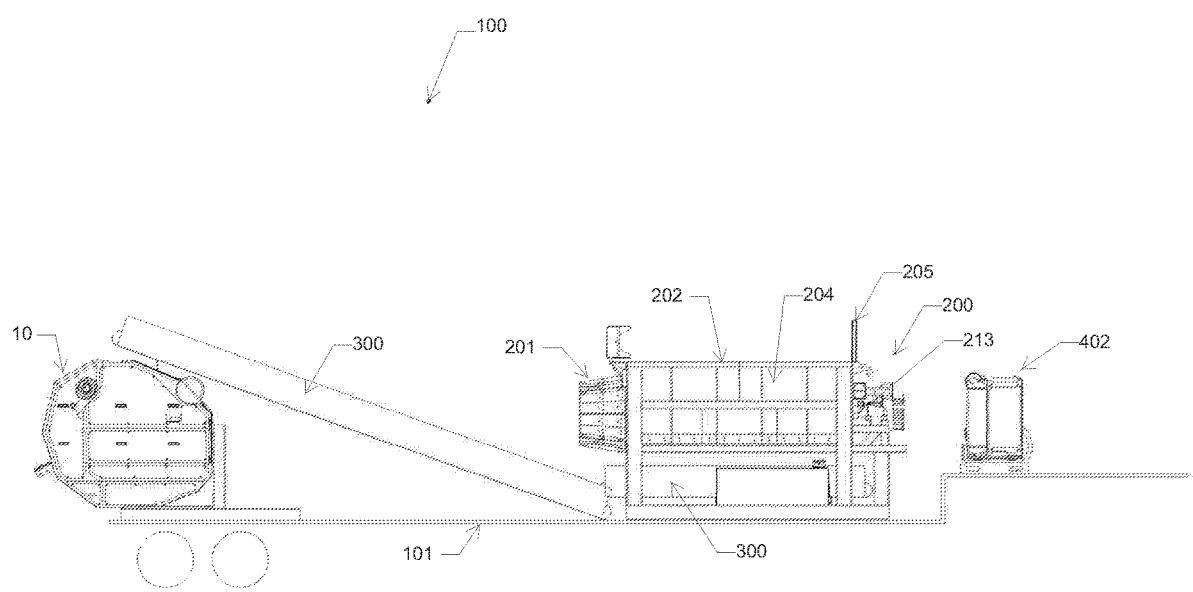
FIG. 6 is a side view of a shredding and baling apparatus in accordance with one aspect of the present invention.
Figure 8:
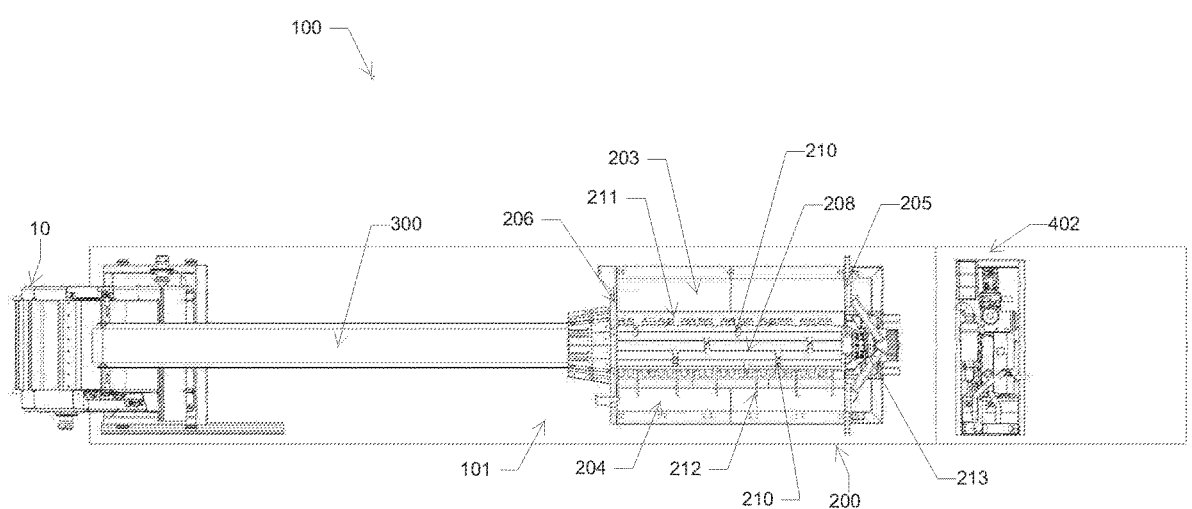
FIG. 8 is a top view of a shredding assembly in accordance with one aspect of the present invention.

As best illustrated in FIGS. 1 and 8, the shredder assembly 200 includes an intake hopper 202 for receiving the material that is to be shredded. In one embodiment, the intake hopper 202 is designed to be top-loaded and is comprised of two opposed side walls 203, 204 that extend upwardly at a preferably obtuse angle, and a front 205 and rear 206 wall that each define an opening 207 for receiving a rotatable shredding mechanism 201. The bottom of the intake hopper 202 is preferably open to allow the shredded material to fall directly onto the conveyor 300. Each of the opposed side walls 203, 204 preferably include at least one row of fixed teeth 211, 212 mounted horizontally along the length of each side wall 203, 204, as best seen in FIGS. 4 and 8. The fixed teeth 211, 212 are discussed in more detail below. It is to be understood that the intake hopper 202 is not limited to the embodiment described and may be any shape or dimension suitable to hold the material that is to be shredded.

The intake hopper 202 may be loaded by hand by tossing material or pieces of scrap into the hopper 202, or preferably by construction equipment such as a material handler or excavator claw attachment that can grab and lift large quantities of material into the intake hopper 202 at one time.

Shredding Mechanism

In a preferred embodiment, the shredding mechanism 201 is comprised of a cutting drum 208 rotatable along a rotational axis and oriented along a horizontal axis. The cutting drum 208 is preferably positioned in the lower, central portion of the intake hopper 202, parallel between the two opposed side walls 203,204. The diameter and length of the cutting drum 208 may be any suitable dimension depending upon the desired size of the shredding assembly 200. The cutting drum 208 preferably comprises at least a support body 209 and a plurality of cutting teeth 210 carried on the outer portion of the drum 208 and preferably arranged in a spiral orientation along the outer surface. One example of a shredding mechanism is described in U.S. Pat. No. 7,980,278 of Labbe et al. incorporated herein by reference.

Figure 7:
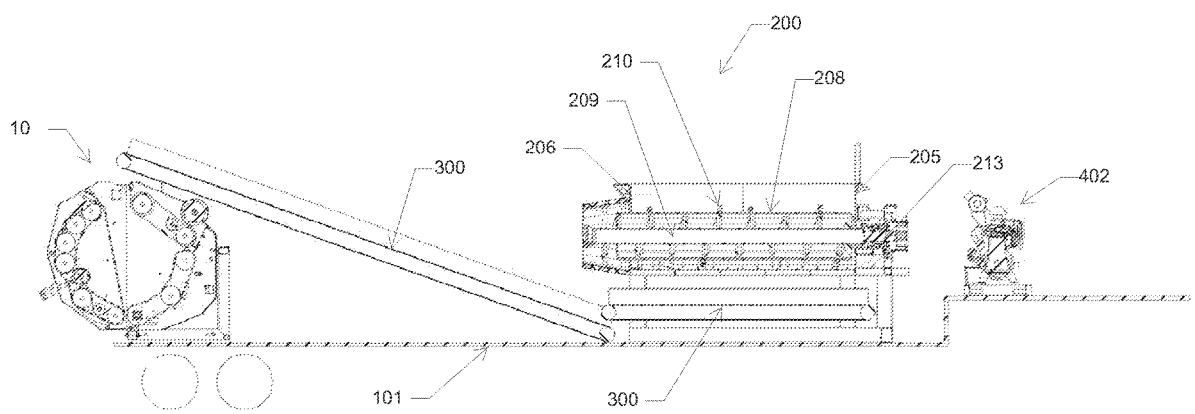
FIG. 7 is a side cross sectional view of a shredding and baling apparatus in accordance with one aspect of the present invention, illustrating the shredding mechanism of the shredding assembly and the rollers of the baling assembly.

By arranging the teeth spirally, as best shown by FIGS. 4, 7, and 8, the resulting cut is more powerful. For example, if a 2×4 piece of wood is placed in a shredding mechanism with cutting teeth arranged in parallel longitudinal rows. (as typically seen in shredders of the prior art), as the 2×4 comes in contact with the row of cutting teeth, it will be pushed along with the row of cutting teeth, following the rotation of the shredder or drum. This type of arrangement results in a less efficient cut that may require additional cutting drums working together, or additional passes through the cutting drum as it rotates. Contrarily, when the cutting teeth are spirally arranged as in the present invention, rather than making contact with a row of cutting teeth simultaneously, the 2×4 makes contact with each cutting tooth following one another in quick succession. Rather than traveling with a row of cutting teeth as the drum rotates, instead the wood is pushed against cutting tooth after cutting tooth consecutively, being pulverized as the drum rotates.

In an alternative embodiment, a plurality of protective collars or ribs may be mounted concentrically at spaced intervals along the outer surface of the cutting drum, with cutting teeth mounted between adjacent collars. One example of protective collars is described in U.S. Pat. No. 7,967,044 of Labbe et al. incorporated herein by reference.

Cutting Teeth

The cutting teeth 210 mounted on the cutting drum 208, also referred to herein as mobile teeth, may be any suitable type of cutting tooth. The mobile teeth 210 may be removable so that different types of cutting teeth 210 may be mounted on the drum 208 as desired depending on the type or types of material that is to be cut. For example, hammer teeth may mounted on the drum 208 for cutting mixed materials found at a demolition site, such as garbage, metal, plastic, wood, etc. Particularly, if the job requires cutting wood to be used for biomass, then a brush cutting tooth may be used. An exemplary cutting tooth and cutting tooth mount is described in U.S. Pat. No. 8,893,997 of Gaudreault, incorporated herein by reference.

Figure 2:
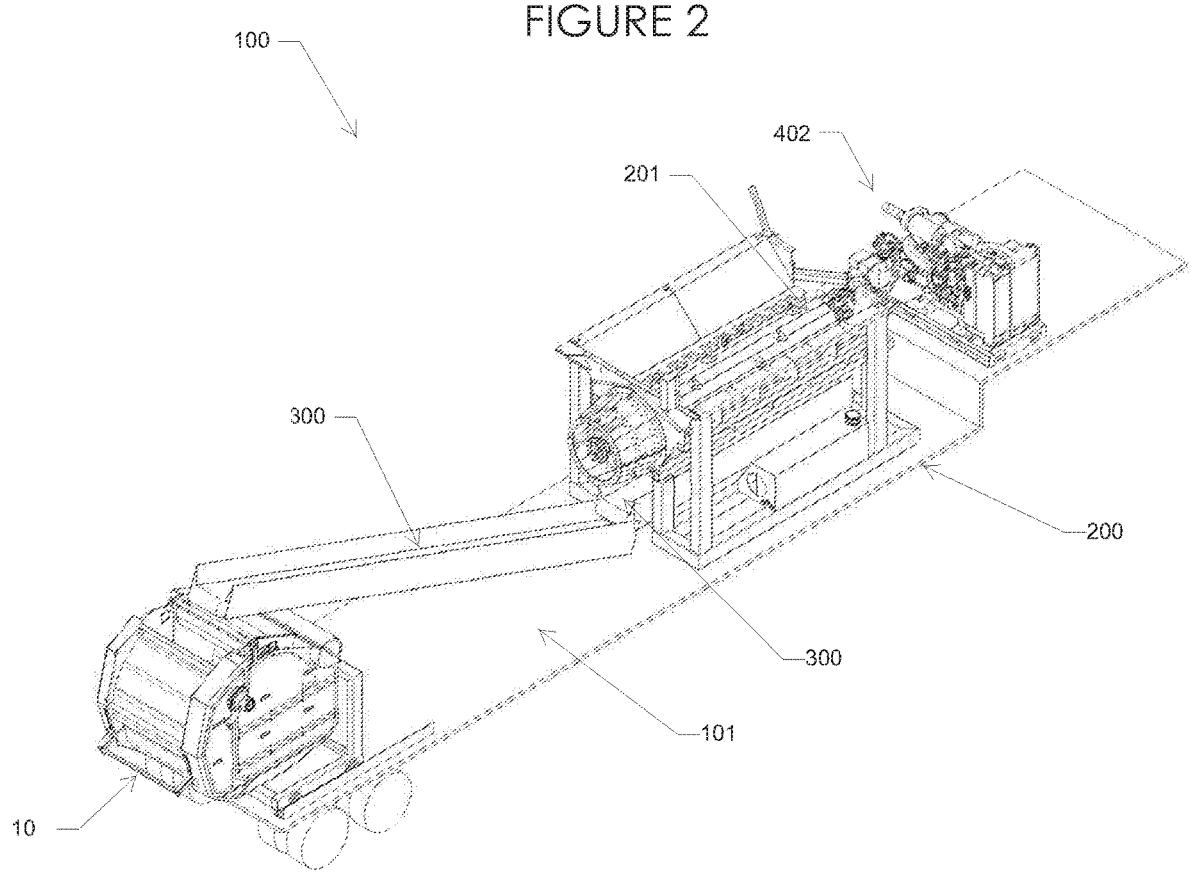
FIG. 2 is a rear perspective view of a shredding and baling apparatus in accordance with one aspect of the present invention.
Figure 3:
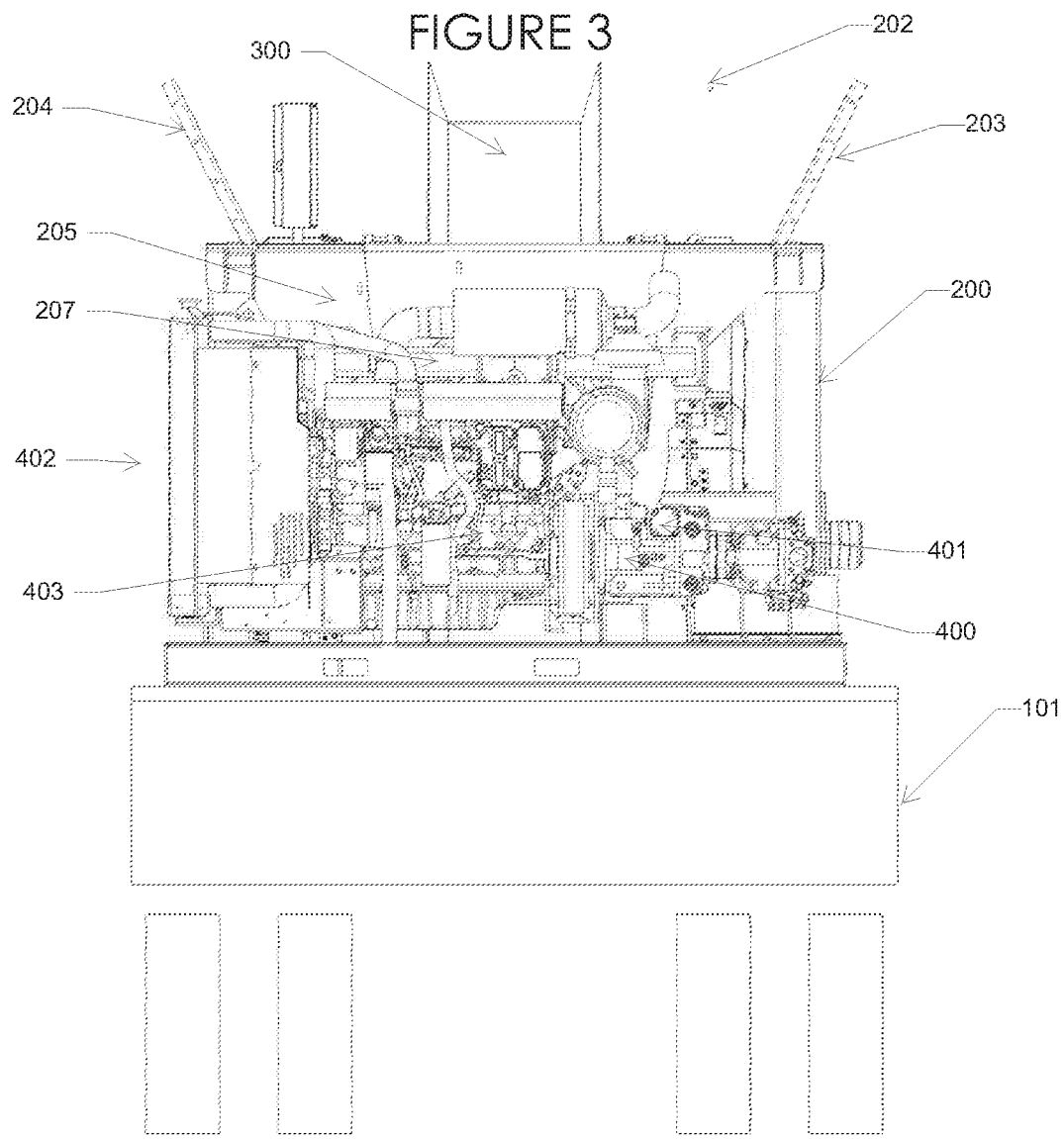
FIG. 3 is a front view of a shredding and baling apparatus in accordance with one aspect of the present invention.

As described above, each of the opposed side walls 203, 204 of the intake hopper 202 preferably include at least one row of fixed cutting teeth 211, 212 mounted horizontally along the length of each side wall 203, 204. The type and arrangement of fixed teeth may vary. For example, FIGS. 4 and 8 shows fixed cutting teeth 211 extending out along a horizontal plane toward the rotatable cutting drum 208, while fixed cutting teeth 212 extend upward at an angle similar to that of the side walls 203, 204. A variation of the type of fixed teeth included along the walls 203, 204 of the intake hopper 202 may increase the efficiency of the cutting and shredding process. As the cutting drum 208 rotates, the mobile teeth 210 mounted along the cutting drum 208 pass through spaces defined between the fixed cutting teeth 211, 212, as illustrated by FIGS. 1, 2, and 8.

Power Unit

The entire apparatus 100 is powered by a power unit 402 preferably consisting of hydraulic motors 58, 213 and pumps operatively connected to and supplying power to drive the rotation of the shredding assembly 200, the conveyor means 300, and the baling assembly 10. These main components of the shredder-baler apparatus 100 may be connected via hydraulic lines. The power unit 402 is preferably controlled by a computer operatively connected to the power unit 402 so that the entire assembly of shredder 200, conveyor 300, and baler 10 operate together and is coordinated automatically. The computer system is discussed in more detail herein. The hydraulic pump 400 or pumps may include pressure sensors 401 to monitor the pressure of at least the shredding mechanism 201. The power unit may also include an engine such as a diesel engine 403.

In a preferred embodiment, a motor 213 drives rotation of the cutting drum 208 at a relatively slow speed. A preferred range of speed may be 35-55 rpm, with a more preferable speed of 45 rpm for example; although, it is to be understood that the speed may be set at any desired or suitable rpm depending upon the use. Although a faster speed may be used, a slower speed may allow for a more powerful and efficient cutting as large quantities of mixed materials are dropped into the shredding assembly 200. The power unit 402 may be designed such that if the cutting drum 208 becomes obstructed in any way, for example an object gets stuck or lodged in the drum 208 as it rotates, then the motor 213 may automatically counter-rotate the drum 208 in the opposite direction for a predetermined amount of time until the obstruction is removed and cutting may resume. Preferably, this process is automatically controlled by the power unit 402, negating the need for operator intervention.

The predetermined time interval for reverse rotation may be set by a timer operatively connected to the motor 213 and/or incorporated into the computer system; the timer may be set for 30 seconds, 45 seconds, or any time interval as desired or needed to dislodge an obstruction. An obstruction of the cutting drum 208 may be determined by an increase in pressure detected by the pressure sensor 401 on the hydraulic pump 400. For example, if the drum 208 is rotating counterclockwise as it shreds through material, and resulting debris gets lodged in the cutting mechanism 201 causing an obstruction, then the pressure in the hydraulic pump 400 may rise. Once the pressure sensor 401 detects that the pressure has reached approximately 5000 psi (or any other predetermined or programmed setting or level), the motor 213 driving the drum 208 may automatically switch rotation of the drum 208 in a clockwise direction for the predetermined time interval (for example, 30 seconds) to allow for the obstruction to become dislodged. Once the timer has reached 30 seconds (or any other predetermined pre-set time interval), the motor 213 will resume rotation of the drum 208 in a counterclockwise direction, thus resuming the cutting operation. This entire rotation, counter-rotation process preferably occurs automatically and is controlled by the various components of the power unit 402.

Conveyor Means

A conveyor means 300, such as a conveyor belt, is powered by a motor and operatively connected to the shredding assembly 200 and the baling assembly 10. In a preferred embodiment, the front of the conveyor 300 is located directly underneath the shredding mechanism 201, substantially aligned with the front of the shredding assembly 201, as illustrated best by FIG. 7. The conveyor 300 moves in a direction that carries the shredded debris away from the shredding assembly 200 and toward the baling assembly 10, terminating above the baling assembly 10, as shown in FIG. 1.

The cutting drum 208 is preferably open to the conveyor 300 such that as shredded material drops from the shredding mechanism, it may fall directly onto the conveyor 300 where it may be carried to and dropped into the baler hopper 46 of the baler assembly 10 for baling. The conveyor 300 is operatively connected to the same power unit that drives the rotation of the cutting drum 208 and the operation of the baling assembly 10 so that all units of the apparatus 100 operate together. If the baling assembly 10 reaches capacity and ceases operation to prepare for releasing a bale, then operation of the conveyor 300 may cease as well. If operation of the baling assembly 10 and shredding assembly 200 resume, then operation of the conveyor 300 may resume as well.

Baling Assembly

One preferred embodiment of a baling assembly 10 (also referred to herein as a "baler") is illustrated in FIGS. 9-16. A housing 12 includes a fixed member 14 and a pivoting door member 16. The front 18 and rear sides 20 of the housing 12 preferably include an inner wall 22 and an outer wall 23. A series of rollers (24,26,28,34) are disposed about the inner periphery of the inner wall 22 of the housing 12 in a generally circular configuration. A series of belts (40,42, 44) are disposed about the rollers within the inner walls 22 of the housing 12. A baler hopper 46 is positioned on the top of the housing 12, and is used to screen and feed bale material into the baler 10. A wrap feeder 48 is positioned on an outer portion of the housing 12, and holds a roll of wrap material, preferably in the form of a strong netting material, which may be fed into the baler 10 and wrapped around the bale once the bale has been formed and compressed.

Housing

Preferably, the housing 12 is comprised of a fixed member 14 and a door member 16 that may pivot upward and outward as shown in FIG. 16b. In one embodiment, the housing 12 includes front 18 and rear 20 frame members that are spaced apart and occupy parallel planes. The frame members (18,20) are connected by various components, including support members, rollers, and a base 50. Each frame member (18,20), in a preferred embodiment, includes two separate walls—an inner wall 22 and an outer wall 23. Rollers (24,26,28,34) are situated between the frame members (18,20), and a baling cavity 52 is defined between the frame members (18,20), and the rollers extend about a periphery of the housing 12 in a generally circular configuration between the inner walls 22 of the frame members (18,20). The outer wall 23 is spaced apart from the inner wall 22 on each frame member, creating a defined and enclosed space for various components, including hydraulic pistons 38 and components, pulleys 54, drive belts 56, and the like. This arrangement allows these components to be separated from the baling cavity 52, and further, to be isolated between the inner 22 and outer walls 23, which protects them from outside elements, including water, dust, dirt, and the like. An additional benefit to this configuration is that sections of the outer wall 23 may be removed for repair and maintenance purposes.

Rollers

There are a variety of different rollers (24,26,28,34) disposed within the inner walls 22 of the housing 12 that are used in the baling process. In a preferred embodiment, some of the rollers are disposed in a fixed position with respect to the housing, and are rotationally driven by a hydraulic motor 58 (either directly, or are driven indirectly via a belt or chain drive mechanism). These rollers are referred to herein as "driven rollers" 24. A second set of rollers 26 is fixed to the housing 12 (not adjustable, not driven), and these rollers are referred to herein as "fixed rollers" 26. The fixed rollers 26 simply rotate in correspondence with the belt (40,42,44) that engages them, due to frictional engagement with the belt. A third set of rollers 28 is adjustable with respect to the housing 12, so that they may slide inwardly toward a central portion of the housing 12, thus loosening the belt; or outwardly toward a perimeter thereof, thus tightening the belt, and these rollers are referred to herein as "adjustable rollers" 28. The adjustable rollers 28 are actually fixed during the baling operation, so for operational purposes, the adjustable rollers 28 behave in the same manner as the fixed rollers 26. The adjustable rollers 28 are mounted to a slide mechanism 30 that is received into slots 32 in the housing 12, as shown, so that the slide mechanism 30 may be moved between an operational position (creating higher tension on the engaged belt) and a maintenance position (relaxing tension on the engaged belt), and secured into either position. A means for adjustment is provided on these adjustable rollers 28 for maintenance purposes, simply to facilitate removal and reattachment of the belts that engage those rollers 28 when maintenance needs to be performed.

Lastly, a tensioner roll 34 is used to push the belt against the bale material during the baling operation. The tensioner roll 34 is mounted onto a track 36, as shown, and a hydraulic motor is used to push the tensioner roll 34 inwardly along the track 36 and against the belt 40 from the outside of the belt 40 (from within the belt "loop") via a hydraulic piston 38, as shown, in order to apply significant compression forces to the bale material during the baling operation. The tensioner roll 34 is not driven in a rotational manner in a preferred embodiment, but instead is simply forced against the belt inwardly as described above. The track 36 includes a chain mechanism 39 that engages with a gear 41 that is disposed on the outer part of the tensioner roll 34 axis. As the tensioner roll 34 is moved inwardly and outwardly along the tracks, the gear 41 and chain 39 assembly ensure that both sides of the tensioner roll 34 remain evenly positioned between the tracks, which helps to keep uniform pressure against the belt and baling material. Additionally, this gear and chain mechanism helps to provide a smoothly shaped, symmetrical bale, rather than a lumpy, irregularly shaped bale. This same gear and chain mechanism may also be applied to and incorporated in the hinged portion 62 of the door 16, discussed below, in order to provide uniform compression on each side of the bale during a baling operation.

Optionally, the rollers (24,26,28) may include a small notch on a side thereof, for expelling small bale material chips that become lodged between the circular side of the roller and the inner wall 22 of the housing 12. The concept is that the chip, which is pinched between the side of the roller and the wall 22, will fall into the notch during rotation of the roller, and then fall out when that portion of the roller disengages from the belt during normal rotation. Then, the chip can be expelled from the housing by the auger mechanisms 60.

Belts

A series of large, flexible belts (40,42,44) are used to rotate, compress and form the bales from the bale material. Each of these belts (40,42,44) engage and wrap around a specific set of rollers (24,26,28,34) within the inner walls 22 of the housing, so that the driven rollers 24 rotationally drive the belts, and the fixed rollers 26 and adjustable rollers 28 guide the belts. When a belt needs to be replaced, the adjustable rollers 28 are moved into maintenance position, thus loosening and reducing tension on the belt to facilitate removal of the belt from the rollers. When a new belt is properly positioned around the rollers, the adjustable roller 28 is then moved back into its operational position, which may provide tension to the belt, and then the adjustable roller 28 is tightened and secured into that operational posture.

In a preferred embodiment, three separate belts are used within the baler. One belt 40 extends around all of the rollers that are positioned on the door side of the housing ("door belt" 40). The top roller 24 that engages the door belt 40 is driven directly by a hydraulic motor 58, which is mounted on the side of the housing 12. The remaining rollers (26) on the door side of the housing that engage the door belt 40 are fixed rollers, with the exception of the tensioner roller 34. The upper portion of the inner wall 22 of the housing on the door side includes a hinged portion 62 that allows the upper three rollers to move upwardly and downwardly in concert with one another. A hydraulic piston 38 is disposed between the hinged portion 62 of the door housing 16 on the inner wall 22 and a fixed portion 64 of the door housing 16 on an inner wall 22, as shown. The hydraulic piston 38 exerts a closing or compression force on the hinged portion 62 of the door housing 16, and during the baling operation, as the bale grows larger, the hinged portion 62 is forced upwardly by the increasing size of the bale. This arrangement helps to provide compression forces to the bale material during the baling operation. A pair of contact sensors (66,68) engage the hinged portion 62 of the housing to determine 1) when the bale is nearing maximum capacity but has not yet reached maximum capacity, and 2) when the bale has reached maximum capacity. The sensor system will be discussed in more detail herein below.

On the fixed side 14 of the housing 12, in a preferred embodiment, an upper belt 42 engages the rollers on the upper side of the housing 12, while a lower belt 44 engages the rollers on the lower side of the housing 12, as shown. The upper belt 42 is rotated by a driven roller 24 having an axle that extends outwardly through the inner wall 22 of the housing 12, which engages a drive belt 56 attached to a hydraulic motor 58. A belt tensioner 70, mounted on the outer portion of the inner wall 22, engages the drive belt 56 that runs between the hydraulic motor 58 and the driven roller 24, in order to maintain tension on the drive belt 56. The top roller 28 on the fixed side 14 of the housing 12 is an adjustable roller 28, while the remaining roller(s) engaged by the top belt 42 are preferably fixed rollers 26.

A lower belt 44 engages the rollers disposed on the lower side of the fixed portion 14 of the housing 12. The top roller 24 that engages the lower belt 44 is directly driven by a hydraulic motor 58 that is disposed between the inner wall 22 and the outer wall 23 of the housing 12, as shown. The bottom roller 24 that engages the lower belt 44 is indirectly driven by the hydraulic motor 58 via a drive belt 56 extending therebetween, which is also positioned between the inner 22 and outer walls 23 of the housing 12. A belt tensioner 70 engages the drive belt 56 between the hydraulic motor 58 and the bottom driven roller 24, as shown.

Overall, the belts (40,42,44) are positioned so that they axe each in close proximity to one another, such as in the lower portions of the baling cavity 52 (where the bale is formed within the housing 12), except for a gap between the door belt 40 and the upper belt 42. This gap in the top of the baling cavity 52 is adjacent to the hopper 46, and allows baling material to be fed by the hopper 46, through the gap, and into the baling cavity 52. This arrangement allows baling material to be fed into the baling cavity 52 without having significant amounts of the baling material fall through any small cracks or gaps between the belts in the lower portion of the housing.

Auger System

Inevitably, during the baling operation, some small pieces, chips or particles of the baling material may fall into cracks and crevices within the housing, for instance, between the belts and the inner wall of the housing, and landing outside of the baling cavity 52 but remaining within the housing 12. A system is provided to remove these small pieces of baling material from the housing 12, so that they do not interfere with the operational components of the baler 10. In one embodiment, a pair of hydraulically driven augers 60 are positioned in parallel relation to the rollers (24,26, 28,34) within the belts (40,42,44), near an outer periphery of the inner walls 22 of the housing 12, as shown. These augers 60 are rotated and directly driven by hydraulic motors 58 during the baling operation. During use, the chips are caught up in the rotating helical screw blade and transported to an exit port 72 in the side of the housing 12 where they are ejected therefrom. Optionally, a chute 74 may be mounted on an outer portion of the housing 12 adjacent the exit port 72 to direct the flow of ejected chips.

Additionally, a small amount of baling material will fall between the small gap between the bottom of the door belt 40 and the lower belt 44 on the fixed side 14 of the housing 12. To address this issue, a small enclosure is placed below the gap to catch the baling material that falls therethrough. When the enclosure is full of baling material, then the baling material within the enclosure acts as a stopper, preventing any additional baling material from falling between the gap. The enclosure empties out when the bale is released from the baler, and tends to refill during every baling cycle.

Sensor System

A series of sensors are used to monitor the progress and functional aspects of the baling operation in progress. Contact sensors (66,68) are used to monitor the size of the bale within the baling cavity as shown in FIG. 8a. A preliminary contact sensor 66 is attached to the housing on the door 16 adjacent to the hinged portion 62, and senses when the hinged portion 62 begins to "open," or move upwardly and outwardly due to the size of the bale. This preliminary contact sensor 66 is used to tell the operator that the bale is nearing its maximum capacity, but has not yet reached maximum capacity. A final contact sensor 68 is mounted above the hinged portion 62 of the housing 12 on the door 14, and provides an alert signal when the hinged portion 62 has extended outwardly far enough to indicate that the bale has reached its maximum capacity. The final contact sensor 68 alert is used to initiate the wrapping process, whereby the wrap feeder 48 engages and begins to wrap the bale in the final step before the bale is released from the baler 10. A door contact sensor is disposed at a point between the fixed housing 14 and the door 16, to indicate whether the door 16 is opened or closed.

There is also a sensor operatively connected to the tensioner roll 34, in order to monitor and control the amount of force the tensioner roll 34 is exerting against the belt 40 and the baling material. The computer is programmed to provide systematically increasing pressure on the belt 40 and baling material as the baling operation progresses, so that the maximum pressure is exerted by the tensioner roll toward the end of the baling cycle when the bale is reaching maximum capacity. During operation, the computer controls the amount of pressure applied by the tensioner roll 34, and preferably provides intermittent, cyclical pressure, so that the tensioner roll applies high pressure, then backs off and releases some pressure, and then reapplies significant pressure, all in a continuous cycle.

These sensors are all operatively connected to a computer system, which not only displays the information gleaned from the sensors on a display for the operator's information, but also for use in triggering and controlling other actions by the baler (or baler components) during the baling operation.

Hydraulic System

The majority of the moving components of the baler 10 are driven by the hydraulic system, which includes hydraulic motors 58 for rotating the driven rollers 24, and hydraulic pistons 38 for opening and closing the door 16 and for providing compression forces to the tensioner roll 34 and the hinged portion 62 of the housing 12 on the door side 16. A hydraulic distribution valve 78 ("body valve") is used to distribute the hydraulic forces to the various hydraulic components, and is mounted on the side of the housing 12 between the inner 22 and outer walls 23. A hydraulic motor 58 also powers the wrap feeder 48, and small hydraulic motors 58 drive the augers 60.

The hydraulic motors 58 are preferably driven by a standard hydraulic pump, which may be directly attached to the baler 10, or which may be attached to and powered by another piece of equipment used in conjunction with the baler.

The other hydraulic components are driven by a low pressure sensing pump, which is connected to the body valve 78. The body valve 78 works as a distribution valve, sending hydraulic fluid under pressure to the desired component at the desired time, and it is also capable of monitoring pressure levels, acting as a sensor in that way.

The low pressure sensing pump and body valve 78 are operatively connected to the computer system, which is programmed to control the body valve 78 and to receive information (including pressure levels, etc.) for monitoring and safety purposes.

Computer/Display

In a preferred embodiment, a computer is operationally connected to various components of the shredder-baler 100 in order to monitor and control different aspects of the assembly operation. Preferably, a touch screen display is used as an interface between the operator and the shredder-baler apparatus 100, so that the operator can control and monitor many aspects of the operation. For instance, the computer is used to monitor the signals from the various sensors, as described above. This information is preferably displayed on the display screen as information to the operator.

Further, in a preferred embodiment, the computer is used to automate and control many aspects of the baling operation. For instance, when the computer receives a signal from the preliminary contact sensor 66, it activates an alert signal for the operator to let him or her know that the bale is nearing maximum capacity. The operator may then begin to maneuver a skid steer near where the bale may be released, thus increasing time efficiency for lifting and bale and carrying it to a flatbed for stacking. When the final sensor indicates that the bale has reached maximum capacity, the computer automatically actuates the wrap feeder 48, so that the wrap material begins feeding into the baling cavity 52 to wrap the bale prior to releasing the bale from the baler 10. The computer also monitors the pressure forces on the bales, the operation of the hydraulic motors 58, the hydraulic distribution valve 78, the hydraulic low pressure sensing pump, the actuation and speed of the wrap feeder 48 (for tension), and other parameters and systems, to ensure proper and safe operation. Certain events or warning signals received by the computer from sensors may act as a trigger to shut down the shredding and baling operation for safety reasons, in order to prevent additional damage to the shredder-baler apparatus 100 or its components due to a malfunction or improper use.

It should be understood that while a touch screen is the preferred display and interface, other types of displays or controls may be used. Further, the display and/or controls may be located in any desired position or location, whether attached directly to the housing of the baler, the shredding assembly, or remotely (in the cab of a truck or vehicle that is connected to the assembly, for instance.)

Operation

It is contemplated that the shredder-baler apparatus 100 may be driven onsite wherever large clean-up or material removal is needed. During a preferred embodiment of the shredding operation, equipment such as a material handler or excavator with claw attachment may be used to pick up and drop material to be shredded and baled into the intake hopper 202 of the shredding assembly 200. As the material comes in contact with the rotatable cutting drum 208, the spirally arranged mobile cutting teeth 210 and fixed cutting teeth 211, 212 cut through the debris, shredding it and reducing it in size. As the cutting drum 208 rotates, the shredded debris is gravity fed from the intake hopper 202 and the cutting drum 208 onto the moving conveyor means 300. The debris may then be conveyed from the shredding assembly 200 to the baler hopper 46 of the baling assembly 10.

During a baling operation, in a preferred embodiment, the conveying means 300 is provided for feeding baling material into the baler hopper 46 in a continuous fashion. As the bale material is fed through the baler hopper 46 and into the baling cavity 52, the hydraulic motors 58 of the baler 10 are rotating the driven rollers 24, which, in turn, rotate the upper 42 and lower belts 44. The rotation of the upper 42 and lower belts 44 then cause the fixed rollers 26 to rotate. Typically, in an empty baling cavity 52, the upper 42 and lower belts 44 will rotate due to frictional engagement between the belts and the driven rollers 24. On the door side 16, usually the belt 40 will not begin to rotate until the volume of bale material has reached the point where it forces the belt 40 against the driven roller 24, because in an empty baler, the door belt 40 hangs loosely on the rollers. As discussed previously, the adjustable rollers 28 on the door side 16 operate as fixed rollers during the bailing process; therefore, the rotation of the belt 40 on the door side 16 results in the rotation of the adjustable rollers 28.

When the baling material has reached the "critical mass" to engage all of the belts (40,42,44), then all of the belts rotate the bale material in a clockwise manner, and the tensioner roll 34 begins the process of applying pressure inwardly on the belt 40 and the baling material. The belts, in a preferred embodiment, all rotate at the same speed and in the same direction during the baling operation, and the computer monitors and controls the hydraulic motors 58 to ensure proper speed for each motor and belt.

During the baling operation, the auger members 60 are constantly rotating, transporting errant chips and pieces of the baling material that have inadvertently escaped the baling cavity 52 from the housing 12.

As previously mentioned, when the preliminary contact sensor 66 indicates that the bale is nearing maximum capacity, a signal is sent to the operator. When the bale has reached maximum capacity, the final contact sensor 68 signals the wrap feeder and actuates the wrap feeder 48 to begin feeding the wrap around the bale. At this same time, the contact sensor signals the shredding assembly 200 and conveyor means 300 to automatically and temporarily cease operation to avoid overloading the baling assembly 10 once it has reached maximum capacity.

The wrap feeder 48 may also be controlled by the computer. The wrap feeder 48 is preferably positioned on the fixed side 14 of the housing 12, as shown, and includes a mounted roll of wrap material. This material is fed through a slot in the housing 12 between the upper 42 and lower belts 44 and into the bailing cavity 52, thereby coming into contact with the outer periphery of the bale material. As the belts turn the bale material within the baling cavity 52, the wrap material is fed into the cavity, wrapping around the baling material in the process. The wrap feeder 48 is directly driven by a hydraulic motor 58, and the computer controls the motor speed so that the wrap is fed into the baling cavity 52 at a slightly slower pace than the belts (40,42,44) that rotate the bale material. In this way, the wrap material is under significant tension as it wraps around the bale material, providing additional compressive forces on the bale during the wrapping operation. After the wrap has revolved around the bale several times (preferably 2-3 times, although more revolutions may be employed, as desired), the computer stops the wrap feeder 48 from feeding any additional wrap material into the baling cavity 52, and the wrap material (preferably high-strength polymeric netting) simply snaps, and the bale wrap separates from the wrap material positioned within the wrap feeder 48.

Once the wrapping operation is complete, then the operator may open the door 16 of the housing 12 to release the wrapped bale. The door 16 is controlled by a hydraulic piston 38, which is attached between the door 16 and the fixed housing 14 between the inner 22 and outer walls 23 of the housing 12. In one embodiment, a bale release platform 80 may be positioned below the door 16 to catch the released bale and prevent it from an uncontrolled release. The bales may weigh as much as a ton or more, and the bale release platform 80 facilitates a safe and controlled release of the bale from the baler 10. Once the door 16 of the housing 12 closes, a signal is sent to the shredding assembly 200 and conveyor means 300 to automatically resume operation. In this way, the entire operation is paused once a complete bale is formed and ready for release, then upon release, the entire shredding-baling operation is automatically resumed.

Once a bale is released, a skid steer may be used to lift the bale and move it to another location, such as onto a flatbed truck for transportation off-site. It is contemplated that a preferred embodiment of the shredder-baler assembly 100 can bale an entire 40 yard roll-off container in an estimated 2 bales at approximately one bale per minute. In this way, a large demolition or logging site can be cleared quickly and efficiently.

Although the present invention has been described in considerable detail with reference to certain preferred versions thereof, other versions are possible. Therefore, the spirit and scope of the appended claims should not be limited to the description of the preferred versions contained herein. All features disclosed in this specification may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A method for shredding and baling material comprising the steps of:
    providing a shredding assembly, said shredding assembly comprising an intake hopper having an open top and bottom, said intake hopper including a pair of side walls, a front wall and a rear wall, a rotatable shredding mechanism disposed within said intake hopper, and a means for rotating said shredding mechanism, wherein said open bottom of said intake hopper allows shredded material to fall through said open bottom;
    providing a baling assembly, said baling assembly comprising a housing including a fixed portion and a door, a series of rollers disposed within said housing, a plurality of belts disposed about said rollers, a wrap feeder for feeding a wrap material about said bale material, and means for rotating at least one of said rollers,
    providing a means for conveying shredded material from said shredding assembly to said baling assembly, said conveying means being at least partially disposed below said open bottom of said shredding assembly for receiving said shredded material from said shredding assembly in a gravity fed fashion;
    feeding material to be shredded into said shredding assembly;
    rotating said shredding mechanism in a first direction to shred said material;
    conveying shredded material from said shredding assembly to said baling assembly;
    feeding shredded material into said housing of said baling assembly; and
    baling said shredded material.

2. The method set forth in claim 1, further including the step of providing a contact sensor attached to said housing of said baling assembly for sensing when a bale has reached maximum capacity.

3. The method set forth in claim 1, further comprising the steps of:
    rotating said shredded material between said belts;
    compressing said shredded material;
    engaging said wrap feeder to feed a wrap material around said shredded material;
    providing tension on said wrap material while said wrap material is being wrapped about said shredded material;
    cutting said p material; and
    opening said door of said housing to release a wrapped bale.

4. The method set forth in claim 1, further including the step of providing a computer to control said means for rotating said shredding mechanism, to control said means for driving said roller of said baling assembly, to control said wrap feeder, and to control said door of said baling assembly.

5. The method set forth is claim 1, further it including the steps of:
   pausing operation of said shredding assembly and said means for conveying when said baling assembly has reached maximum capacity; and
   resuming operation of said shredding assembly and said means for conveying after a bale has been released.

* * * * *